Aug. 19, 1969  W. R. NEUBARTH  3,461,614
DEVICE FOR FORMING PARTS SUCH AS GEARS AND SPLINES
Filed Sept. 7, 1966  6 Sheets-Sheet 2

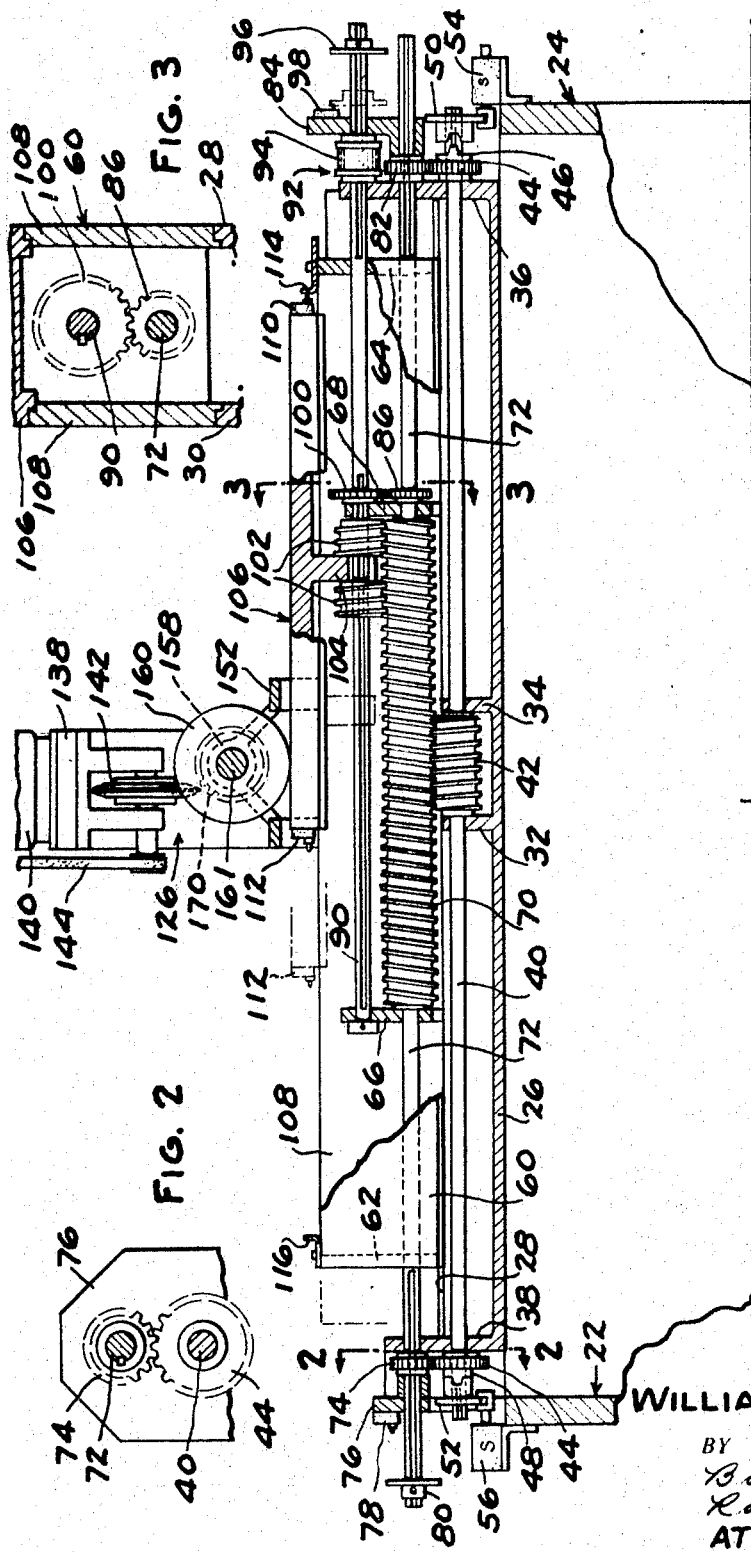

INVENTOR.
WILLIAM R. NEUBARTH
BY
Barnes, Kisselle, Raisch & Choate
ATTORNEYS

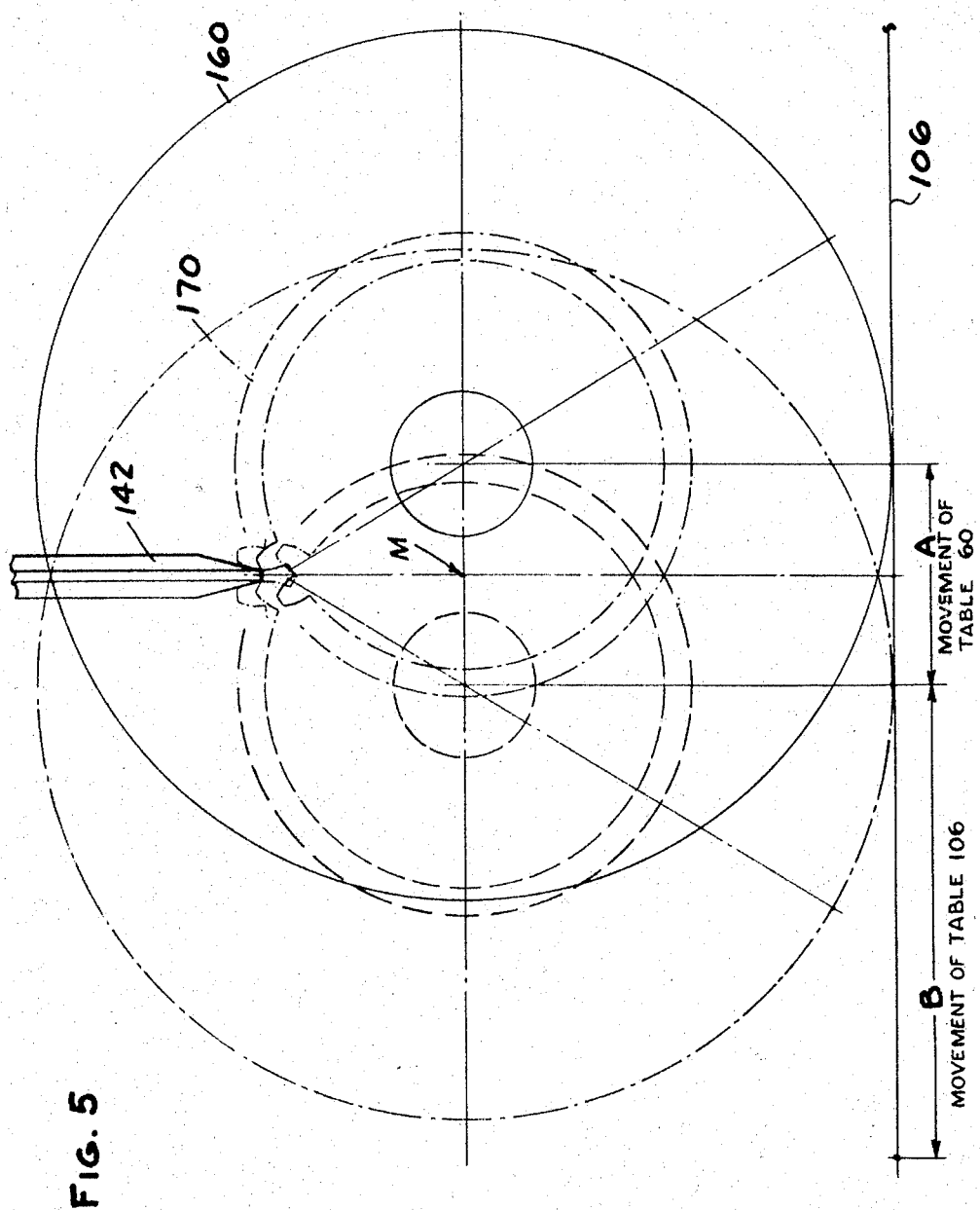

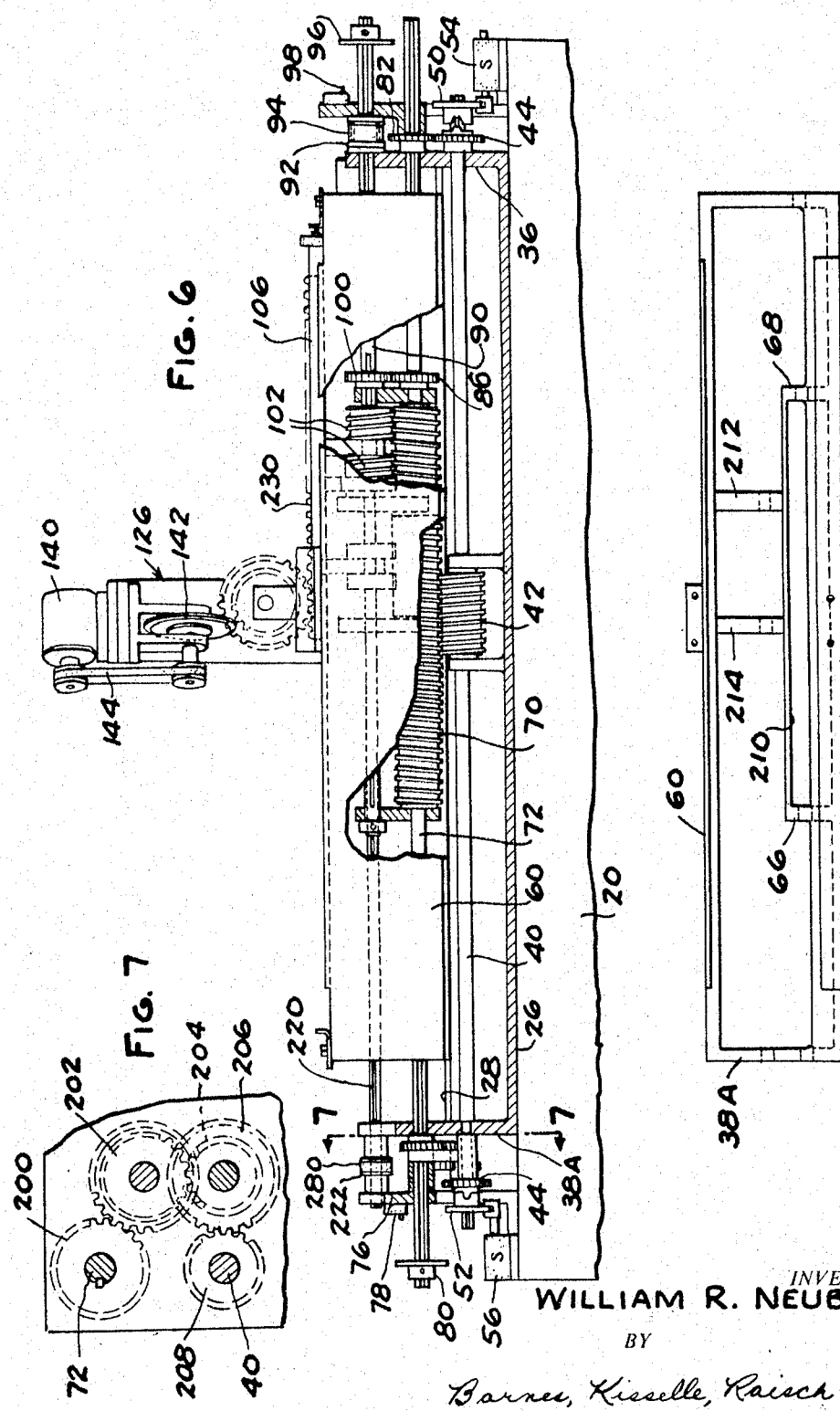

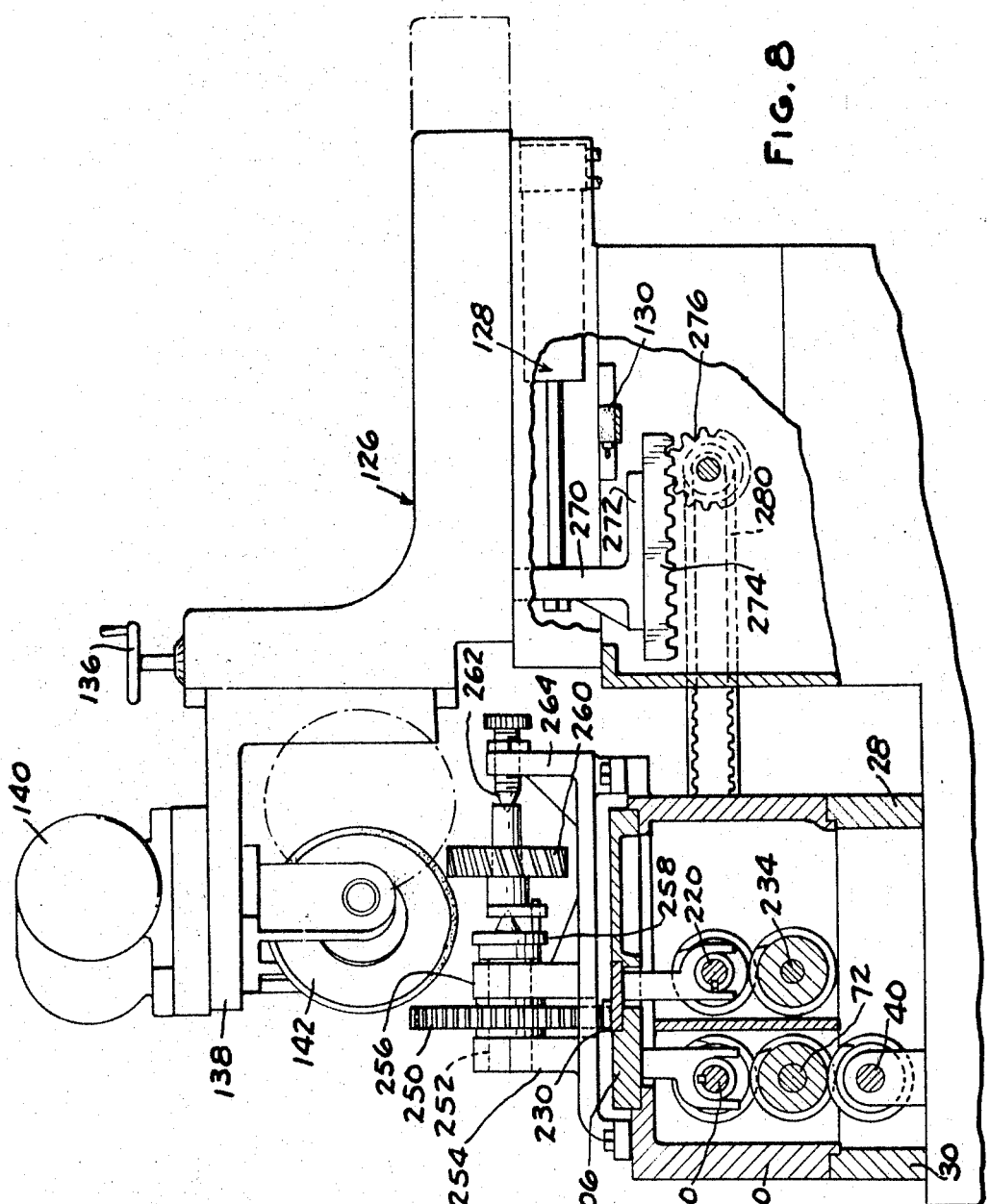

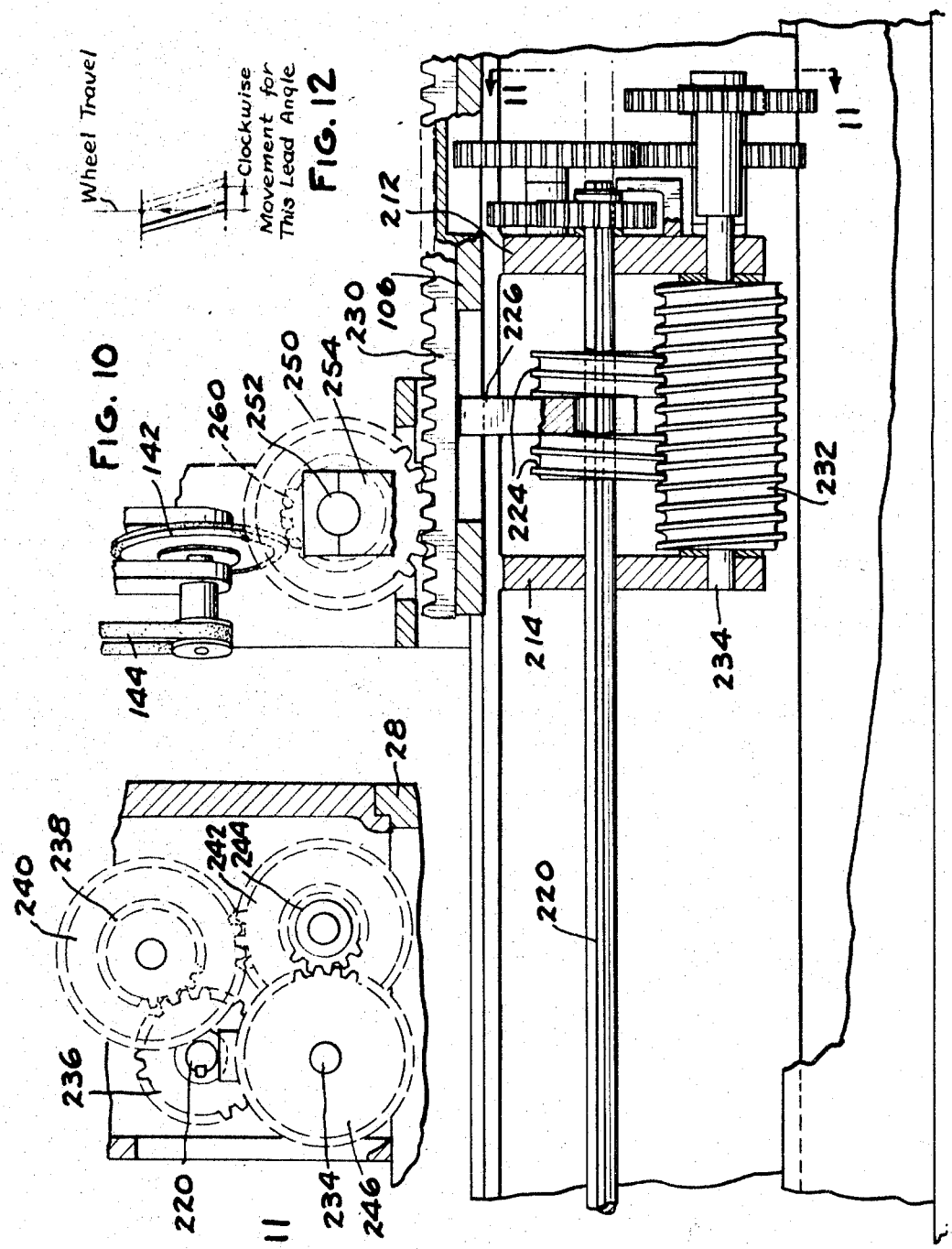

United States Patent Office 3,461,614
Patented Aug. 19, 1969

3,461,614
DEVICE FOR FORMING PARTS SUCH AS GEARS AND SPLINES
William R. Neubarth, Centerline, Mich., assignor of one-third to Elway P. Gray, Royal Oak, and one-third to Joseph B. Whitmore, Inkster, Mich.
Filed Sept. 7, 1966, Ser. No. 577,628
Int. Cl. B24b 5/18
U.S. Cl. 51—52                                10 Claims

ABSTRACT OF THE DISCLOSURE

A feed mechanism for forming parts by stock removal such as gears and splines without the use of a master part which includes a feed mechanism for converting rotational motion to linear motion in an accurate and precise manner to obtain the translation of a particular work part in response to rotary input, the system including, in addition to a stock removing tool, a base, a slide table movable longitudinally on the base, a control slide movable on the slide table, the work being mounted on the slide table and rotated by relative motion between the control slide and the table, this motion being accomplished by a worm and gear mechanism associating the base, the slide table and the control slide.

---

Figure 4:
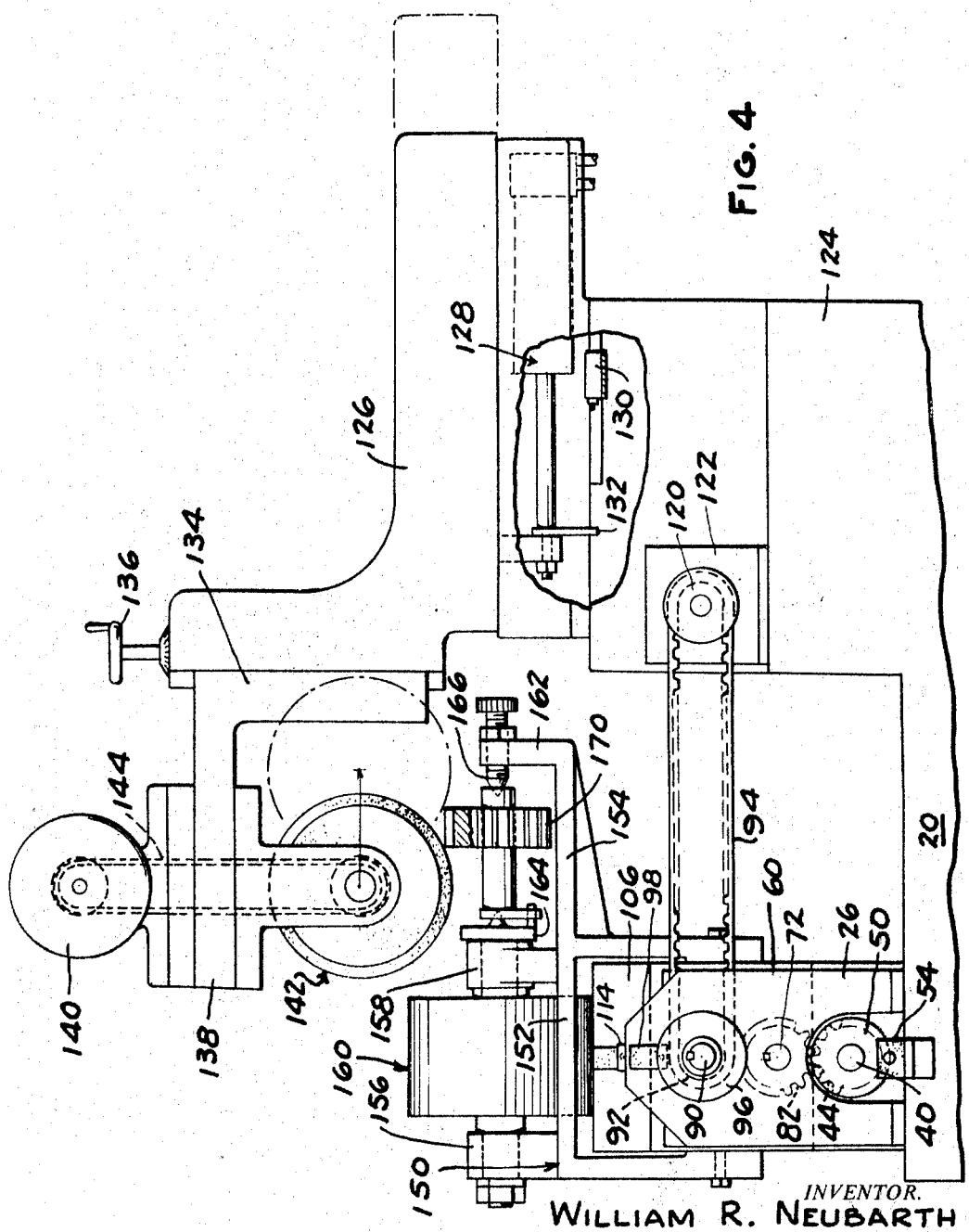

This invention relates to a feed mechanism and more particularly to a mechanism for converting rotational motion to linear motion in a highly refined and controlled manner to obtain very accurate and precise translation of a particular part in response to rotary input.

It is an object of the present invention to provide an improved feed mechanism of the type shown in U.S. Patent No. 3,165,007, issued Jan. 12, 1965.

The present invention contemplates a further refinement of the feed mechanism and discloses in particular a device for obtaining a composite motion which is especially useful in the grinding of gears in such a way that they may be accurate enough to serve as master gears. The ability to produce master gears on a machine of the type to be described will greatly reduce their cost and increase the production thereof over a much more laborious method of manufacture common at the present time.

Another object of the invention is the provision of means for adjusting gear ratio to permit a plurality of ratios to be imparted to a particular machine depending on the job to be done.

A further object is the provision of a machine which can be utilized for manufacturing not only spur gears but spiral or helical gears and also splines.

Other objects and features of the invention will be apparent in the following description and claims wherein there is set forth the manner of making and using the invention in the best mode presently contemplated.

Drawings accompany the disclosure and the various views thereof may be briefly described as:

FIGURE 1, a side elevation of the machine partly in section illustrating the relationship of the main parts.

FIGURE 2, a sectional view on line 2—2 of FIGURE 1.

FIGURE 3, a sectional view on line 3—3 of FIGURE 1.

FIGURE 4, an end view of the assembly shown in FIGURE 1.

FIGURE 5, a diagrammatic presentation illustrating the manner in which the invention may be used for the grinding of gears.

FIGURE 6, a side elevation of a machine assembly designed for cutting spiral gears.

FIGURE 7, a sectional view on line 7—7 of FIGURE 6.

FIGURE 8, an end view partly in section of the assembly shown in FIGURE 6.

FIGURE 9, a plan view of a slide table contained in the assembly of FIGURE 6.

FIGURE 10, an enlarged detail of a portion of the drive assembly of FIGURE 6.

FIGURE 11, a sectional view on line 10—10 of FIGURE 10.

FIGURE 12, a diagram showing lead angle motion for a spiral gear.

The invention to be described involves the use of a device for imparting translatory motion to a particular workpiece and also permits the combining of two different motions to achieve a proper final motion of a work part. In addition, the device facilitates indexing of a workpiece during a manufacturing operation. The device is described in connection with the manufacture of a master gear although it may be used for many purposes.

Referring to FIGURE 1, a base frame 20 has end plates 22 and 24 between which is supported an elongate slide member 26 having spaced slide walls 28 and 30 as shown in FIGURES 1 and 3. Centrally of this slide member are support brackets 32 and 34 which cooperate with end brackets 36 and 38 to support a shaft 40 which carries, centrally of the device between the brackets 32 and 34, a worm 42. At each end of the shaft 40 outside the brackets 36 and 38 is mounted a gear 44. These gears are rotatable on the shaft end and are removable and replaceable so that different sizes may be utilized. Each gear carries respectively clutch members 46 and 48 which can cooperate with solenoid-operated clutch elements 50 and 52 respectively which are splined on the ends of shaft 40. The solenoids 54 and 56 are to be operated by limit switches which will be later described so that they may be selectively energized to actuate clutch element 50 or clutch element 52. Whichever clutch element 50 or 52 is engaged serves as a drive for shaft 40.

An intermediate slide table 60 is mounted to slide on the side slides 28 and 30. This table has end plates 62 and 64 with intermediate upright brackets 66 and 68 between which is mounted a worm 70. This worm is mounted on a shaft 72 which is splined at its ends to pass also through the end brackets 36 and 38 of mount 26, there being a gear 74 splined on this shaft to mesh with gear 44 at the left end of shaft 40. This gear 74 is suitably located in a housing between bracket 38 and a second end bracket 76 which carries also a limit switch 78 to be contacted by an adjustable disc plate 80 on the left-hand end of shaft 72. At the right-hand end of shaft 72 is a gear 82 which meshes with gear 44 of the same size, gear 82 being suitably located between bracket plate 36 and a second end plate 84. A third gear 86 on shaft 72 is located directly to the right of center bracket 68.

Above shafts 40 and 72 is a third shaft 90 mounted in brackets 66 and 68 of intermediate slide 60 and extending to the right through bracket 36 and bracket 84. This shaft is slidable through these brackets and between the brackets carries a drive sprocket 92 driven by a belt 94. On the extreme right-hand end of shaft 90 is a disc plate 96 mounted on the shaft to actuate a limit switch 98 on bracket 84 in its extreme left position. Also splined on shaft 90 is a gear 100 which meshes with gear 86 on shaft 72. A composite worm gear 102 is mounted on shaft 90 on either side of a depending bracket 104 carried by a control slide 106, this control slide being slidably disposed on opposed side edges 108 of intermediate slide 60.

The control slide 106 is intended to traverse the space between the ends of the intermediate table 60 and carries limit switches 110 and 112 to cooperate with switch actuator plates 114 and 116 on the intermediate table 60.

As viewed from the end of the assembly as shown in FIGURE 4, there will be seen the base 20 carrying the slide member 26 on which is slidably mounted the intermediate slide 60 which in turn carries the control slide 106. The drive pulley 92 is shown powered by the toothed timing belt 94 driven by a pulley 120 on a motor 122 carried by the base. The base has a raised back portion 124 to carry the motor and this base also serves to mount a tool slide 126 which is reciprocal on the base by reason of any power device such as a piston and cylinder combination 128, there being a limit switch control 130 actuated by a depending plate 132. The tool head carries a vertical slide 134 controlled in its vertical position by a conventional means such as a hand wheel 136, this slide carrying on a horizontal arm 138 a drive motor 140 and a tool in the form of a grinding wheel 142 driven through a belt 144.

Also shown in FIGURE 4 is a U-shaped bracket 150 having parallel arms extending downwardly and mounted on the intermediate slide table 60. The horizontal run 152 of the bracket extends at 154 to the right and has mounted thereon three upwardly extending bracket arms, two of which, 156 and 158, serve as solid mounting journals for a roller 160 on a shaft 161 and the third of which, 162, cooperates with a center plate 164 to mount an opposed center screw 166 to carry a gear blank or workpiece 170. Thus, the workpiece is mounted on the same axis as the roll 160 which bears against the top surface of the control slide 106.

Thus, the grinding wheel 142 is mounted to move axially toward and away from the circular gear blank 170 as a result of the piston-cylinder combination 128 and any vertical adjustment needed for the grinding wheel is available in a well-known manner through the hand wheel 136. The object of the intermediate table and control slide is to impart the proper motion to the gear blank to obtain proper gear configuration since it is desirable to have a gear rotate at a rate which is definitely related to its pitch diameter. Once the work is mounted, the motor 140 for rotating the grinding wheel is started and the reciprocatory motion of piston-cylinder assembly 128 is initiated. The drive motor 122 is also started to move belt 94 and the pulley 92 rotates shaft 90 and double worm 102. It also rotates gear 100 which drives gear 86 rotating shaft 72 thus driving gear 74. With clutch 52 engaged by solenoid 56, gear 74 on shaft 72 will rotate left gear 44 on shaft 40 and cause rotation of worm 42; and, accordingly, intermediate slide table 60 will be shifted longitudinally in relation to the gear ratios that have been set up by the driving gears for that table and this will also cause relative motion of the control table 106 which will rotate the control roller 160, thus moving the workpiece 170 in the proper roll for the particular space for the gear tooth to be ground.

Obviously, since roll 160 is mounted on intermediate slide 60, the top of the gear blank 170 will be ground off unless a proper roll is imparted to it. In addition, to accomplish a true involute, the gear blank must be moved as it rolls. This is accomplished through the longitudinal movement of table 60 and the relative motion between table 60 and roll table 106, and this relative motion is obtained by reason of the gear 100, the gear 86, worm 70, and the split worm 102.

The roll 160 is selected with an arbitrary diameter, such as, for example, 10 inches. If the pitch diameter of the workpiece 170 is exactly 10 inches, then table 106 moves relative to table 60 a predetermined amount while table 60 is also moving at the same rate to create an involute. This imparts a proper roll and translation to the workpiece to obtain a proper involute on a 10-inch pitch diameter.

If the pitch diameter of the workpiece 170 is larger than the selected 10-inch disc, then the table 60 must move more than the table 106 in the same direction.

On the other hand, if, as shown in the drawings, the pitch diameter of the workpiece 170 is smaller than the selected disc, then the table 60 must move less than the total movement of 106.

For example, in FIGURE 1, with the smaller pitch diameter workpiece 170, the table 60, which carries the roll 160 and the roll table 106, must move a certain distance to the left, while the roll table 106, moving with table 60, also moves relative to it a certain distance to the left but more than the travel of table 60.

In other words, for any particular workpiece pitch diameter and tooth number, the table 60 will always move the same distance relative to the cutting wheel for any one tooth space, but depending on the relation of the pitch diameter size of the work to the selected roll 160, the table 106 will move more or less than the movement of table 60.

This feed will continue until one complete space on the workpiece has been completed by the grinding wheel on the reciprocating slide 126 after which the switch disc 96 contacts the switch 98 on bracket 84 to stop the cycle and start indexing. At this stage in the operation, the hydraulic drive motor 120, which is reversible will, by proper timng control (not shown), reverse the exact amount it went forward and then stop. During this reverse period, clutch 52 which has been engaged is disengaged through solenoid 56 and clutch 50 will be engaged through solenoid 54. The motor 120, in its reverse motion through the belt 94 and the pulley 92, will rotate shaft 90, turning double worm 102, gear 100 and gear 86, rotating worm 70, and also through gear 82 and 44, which are of equal size, cause the control table 106 to move at a rapid rate and index one space on workpiece 170. At this point, it will be noted that worm 42 and worm 70 rotate at the same rate so as not to affect the table movement while indexing. This cycle is then repeated with a forward cycle for cutting, and retracting cycle for indexing, until the spaces between the gear teeth on the workpiece 170 are all cut. Limit switch 112 on table 106 stops the cycle when it reaches stop 116 on intermediate table 60.

This action is shown diagrammatically in FIGURE 5 where the work part 170 is shown in relationship to the grinding wheel 142. The line 106 in FIGURE 5 represents the top of the control table 106 on which the roll 160 is mounted for rolling contact. To prevent slippage, the table 106 can be highly magnetized and the roll 160 can be made of magnetic material, or vice versa, to insure firm contact. The grinding wheel 142 is mounted on a center line which passes through a point M which is the midpoint between the two extremities of the roll of the workpiece. The movement of the intermediate table 60 is shown by dimension A, and the movement of the control table 106 is shown by dimension B. Thus, a true involute motion is imparted to the workpiece as it moves under the grinding wheel.

To recapitulate, when the cycle is started, the control table 106 moves to the left on table 60 a distance sufficient to roll the work piece through one tooth space opening in an involute fashion. At the same time, table 60 carrying table 106 moves to translate the work piece to complete the involute motion and further to compensate for the difference in diameter of the selected roll 160 and the actual pitch diameter of the work piece. At the end of one cut, the control table 106 is advanced relative to table 60 to the left so that the work piece is indexed to a point for a fresh cut of a gear opening. Then table 60 can be moved to the right for the next cut along with table 106. This continues until the gear is finished. At the completion of the operation, the control table 106 will contact the switch actuator 116 to actuate limit switch 112 and end the cycle. At this time slide 126 will retract completely and be stopped by actuation of switch 130. Then the work piece may be removed, the machine reset, and a new piece inserted.

As an example of a calculation of slide travel for a particular gear design, we will assume a pitch diameter of 5″ on the workpiece with 40 teeth, a 20° pressure angle with a stub tooth. By simple mathematics, the base circle for this size pitch diameter comes out at 4.698″. By further calculations, it can be determined that the slide travel for the upper slide 106 is 4.443″. By similar computations, the travel of lower slide 60 is 2.22″.

The general motion is as follows:

(1) The upper and lower slides move to the left on a grinding cycle, then index with a further movement with the upper slide relative to the lower slide; then upper and lower slides move to the right on the next grinding cycle, then index with further movement of the upper slide relative to bottom slide, and repeat the movement to the left and so forth.

(2) At the same time the lower slide which carries the work support oscillates one-half the distance of the lower slide travel, namely 1.11″, to each side of the center line of the grinding wheel for each single grinding cycle.

Similarly, the upper slide, which rolls the gears, oscillates one-half the distance of the upper slide movement, namely 2.221″. In the indexing motion the upper slide gains one tooth space to the left for each index. When considering a 10-inch diameter roller, therefore, the upper slide travels the circumference of the roller, namely 31.416″ to the left in the total grinding of the gear. With a 10-inch roller, the upper slide will always travel this distance, namely the circumference of the 10-inch roller regardless of the size of the gear being ground.

Therefore, by well-known mathematics, it is possible to calculate the relative motion that each table should have for any particular number of teeth and any particular gear size. The motion can be readily accomplished through a gearing connection which is designed to create the necessary motion per tooth grind.

In FIGURES 6 to 10, a modified structure is shown, particularly adapted for use in cutting spiral gears. This structure is very similar to that shown in FIGURES 1 to 4 with certain additional features which will be described. A base 20 carries a slide foundation 26 previously described having the opposed walls 28 and 30 to serve as slide members with end walls 36 and 38A to serve as mounts for the three previously described shafts 40, 72 and 90. The structure has the usual drive belt 94 on sprocket 92 and the axial gears 44 and 82 at the right-hand end respectively on shafts 40 and 72 to operate in the index cycle.

At the left-hand end of the structure shown in FIGURE 6, a more complicated gearing set is utilized for associating shafts 40 and 72, shaft 72 carrying a gear 200 which meshes with respective change gears 202, 204 and 206, the latter gear meshing with gear 208 on shaft 40. The use of a multiple gearing arrangement of this kind allows more versatility in establishing a rotative relationship between shafts 40 and 72. Otherwise, the operation of these parts is the same as described in connection with the first embodiment shown in FIGURES 1 to 4. The intermediate slide table 60 is mounted on the two slide walls 28 and 30 of frame 26 and this table is shown in plan in FIGURE 9.

It will be noted that in addition to a chamber 210 which receives worm gear 70 between end walls 66 and 68, there are additional transverse spaced walls 212 and 214 which serve to mount in connection with end wall 38A an additional shaft 220 which extends also through an end bracket 76 and carries a belt-driven sprocket 222.

As shown in greater detail in FIGURE 10, the shaft 220 at the right-hand end drives a double worm 224 on either side of a depending bracket 226 mounted on a slide rack 230, the mounting of which will be later described. The double worm 224 meshes with a worm 232 which is mounted in parallel relation in the bracket walls 212, 214. Shaft 220 and shaft 234 on which the worms are mounted are related by a gear chain as shown in FIGURE 11. Shaft 220 carries a gear 236 meshing with a set of gears 238, 240, 242 and 244, the latter gear meshing with a gear 246 mounted on shaft 234. Here again, while these shafts might be directly related, the additional gears in the chain give more versatility for the mathematical relationships which are required for gear cutting. If shafts 220 and 234 were operating at the same rate of speed, there would be no motion of the depending bracket 226 but any change in this speed causes the bracket 226 to slide within the limits of the housing walls 212, 214.

A sectional view in FIGURE 8 illustrates the relationship of the rack slide 230 to the control slide 106 previously described in connection with FIGURES 1 to 4. The rack slide 230 is suitably recessed into the surface of the control slide 106, the rack meshing with a drive gear 250 mounted on a shaft 252 journalled in bearing brackets 254 and 256. A work drive and center 258 support one end of a work piece 260, the other end being supported on a center 262 in a bracket 264.

With spiral gearing, it is essential that the grinding wheel 142 be mounted at an angle to the work as shown in FIGURES 6, 8 and 12 wherein the tool slide 126 actuated by the piston-cylinder combination 128 moves transversely of the machine with the grinding wheel at the required spiral angle. The wheel 142 is mounted for suitable drive by the belt 144 operated by the motor 140. An additional attachment, however, is found in FIGURE 8 in the form of a bracket 270 which carries a horizontal plate 272 at its bottom end on which is mounted a rack 274. This rack engages a pinion gear 276 mounted on the base of the machine which drives a belt 280, sometimes referred to as a timing belt since it has a tooth engagement with its supporting pinions. This belt extends to the sprocket 222 of FIGURE 6 to drive the spiral control shaft 220. Thus, when the tool head reciprocates, there will be an oscillation of the shaft 220 and, through the gearing shown in FIGURE 10 relating the two worms 224 and 232, there is a corresponding reciprocation of the compensation rack 230. Thus, as shown in FIGURE 12, in a diagrammatic manner, there is a compensation for the spiral gearing motion as the grinding wheel 142 reciprocates across the work piece 260.

In the operation of the embodiment for cutting spiral gears shown in FIGURES 6 to 12, it will be seen that when the motor 140 is operating along with the motor 122 and the workpiece is in place and clutch 52 at the left-hand end of the structure engaged, then through the gear chain shown in FIGURE 7, there is a drive from shaft 72 to shaft 40 which, because of the variable speed between the two shafts due to the gearing, will cause a translation of the intermediate table 60 carrying the work and the control table 106.

By reason of the worm relationship 102, table 106 moves relative to the table 60 to provide the rolling of the gear blank 260 required to obtain the involute shape. At the same time, the motion of table 60 provides the necessary translational motion and compensates for the difference between the diameter of the pitch diameter of the gear blank and the actual size of the pitch diameter of the drive gear 250 rolling on rack 230.

In addition to this, there is superimposed movement on the rack slide 230 resulting from the transverse motion of the tool slide 126 as reflected through the rack and pinion 274, 276 acting on shaft 220. Then worms 224 and 232 related by the gear chain of FIGURE 11 can cause a relative sliding motion of rack slide 230 to the basic control table 106. Thus, there is compensation for the spiral nature of the gear as well as proper rolling action controlled by rack 230 and gear 250. On the completion of one gear space on the work, the limit switch 98 will stop the motion and there will be a release of clutch 52 and engagement of clutch 50 which will cause an indexing to the next gear space through the relative movement of the table 106 to the intermediate table 60. After this reset, the cycle can proceed again in the formation of another tooth space. This can continue until the gear is fully cut and removed for a new workpiece.

Thus, with the described apparatus, either straight spur gear or spiral gears may be accurately cut with proper involute motion as the master roll rolls on the control table in the forming cycle. It will be appreciated that splines may be cut in helical form in the same manner as helical gears by merely extending the stroke of the cutting wheel.

What is claimed as new is as follows::

1. A device for forming parts by stock removal such as gears and splines without the use of a master part which comprises:
   (a) a longitudinally extending base,
   (b) a stock removing tool mounted to traverse said base,
   (c) a slide table movable on said base adjacent said tool to move longitudinally thereof,
   (d) means on said table to mount a workpiece for rotation on a transverse axis,
   (e) a control slide mounted on said table for longitudinal movement relative to said table and said means to mount a workpiece,
   (f) means to associate said workpiece and said slide to impart a rolling motion to said workpiece upon motion of said slide relative to said table, and
   (g) means to move said table longitudinally relative to said base and said control slide longitudinally relative to said table to impart a roll to, and simultaneous translation of the center of, said workpiece to permit removal of stock from said workpiece in a predetermined path.

2. A device as defined in claim 1 in which said last means comprises:
   (a) a first worm on said base,
   (b) a second worm on said table, and
   (c) a third worm on said slide, respectively engaged in side-by-side parallel relation, each of said worms being mounted on paralel shafts, means to connect said shafts for simultaneous rotation in a predetermined speed ratio, and means to rotate said shafts to impart the designated motion to said table and slide.

3. A device as defined in claim 2 in which the speed ratio between the shafts connecting the first and second worms is variable in a reverse motion to cause indexing of said slide on said table for a new position of said work relative to said tool.

4. A device as defined in claim 2 in which means is provided, responsive to reverse motion of said shafts, to change the gear ratio of said shafts of said first and second worms to cause indexing of said slide on said table and a new position of said work relative to said tool.

5. A device as defined in claim 1 in which the means to associate said workpiece and said slide comprises a roll of predetermined diameter mounted coaxially with a workpiece and positioned to contact a surface on said control slide to receive rolling motion by relative movement of said control slide and said table.

6. A device as defined in claim 2 in which the shaft mounting said first worm, and the shaft mounting said second worms are related for mutual rotation at respective ends by varying gear ratios, and means operable selectively to engage said shafts in one of said gear ratios respectively to move said slide relative to said table in a rolling function, and to move said slide relative to said table in an indexing function.

7. A device as defined in claim 6 in which said means operable selectively to engage said shafts comprises a solenoid actuated clutch at each end of said first worm shaft operable to lock a gear at the respective ends to the shaft for a drive connection.

8. A device as defined in claim 2 in which said shaft mounting said second worm is splined at each end to travel with said table relative to said base, and gears at the respective ends of said shaft mounted against axial movement relative to said base and splined on said second worm shaft.

9. A device as defined in claim 1 in which said last means comprises:
   (a) a plurality of worms positioned in parallel relation and mutually engaged, each being mounted on a drive shaft, means connecting said shafts for ratio rotation, one of said worms being axially stationary, the others being axially movable to produce the designated translational and rotational motion of the workpiece.

10. A device as defined in claim 9 for forming spiral gears including a pair of engaged worms operably associated with said slide and said tool to impart a rotational motion to said workpiece in response to relative motion of said tool and said workpiece to relate said motion to the predetermined spiral path.

References Cited

UNITED STATES PATENTS

| | | | |
|---|---|---|---|
| 1,135,780 | 4/1915 | Drummond et al. | 51—123 |
| 2,136,266 | 11/1938 | Reinecker | 51—52 |
| 3,165,007 | 1/1965 | Neubarth | 74—424.8 |

LESTER M. SWINGLE, Primary Examiner

U.S. Cl. X.R.

51—123, 287